United States Patent
Parvis et al.

(10) Patent No.: US 10,822,973 B2
(45) Date of Patent: Nov. 3, 2020

(54) SHROUD FOR A GAS TURBINE ENGINE

(71) Applicant: General Electric Company, Schenectady, NY (US)

(72) Inventors: Alan Joseph Parvis, Loveland, OH (US); Dane Michael Dale, Cincinnati, OH (US); Ryan Christian Goff, Union, KY (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 15/823,708

(22) Filed: Nov. 28, 2017

(65) Prior Publication Data

US 2019/0162072 A1 May 30, 2019

(51) Int. Cl.
| | |
|---|---|
| *F01D 9/04* | (2006.01) |
| *F01D 5/06* | (2006.01) |
| *F01D 9/06* | (2006.01) |
| *F01D 5/18* | (2006.01) |
| *F01D 25/24* | (2006.01) |

(52) U.S. Cl.
CPC ............... *F01D 9/041* (2013.01); *F01D 5/06* (2013.01); *F01D 5/188* (2013.01); *F01D 9/065* (2013.01); *F01D 25/24* (2013.01); *F05D 2220/32* (2013.01); *F05D 2230/60* (2013.01); *F05D 2260/201* (2013.01); *F05D 2300/6033* (2013.01)

(58) Field of Classification Search
CPC . F01D 9/041; F01D 5/06; F01D 25/24; F01D 9/065; F01D 5/188; F05D 2260/201; F05D 2220/32; F05D 2300/6033; F05D 2230/60
See application file for complete search history.

(56) References Cited

U.S. PATENT DOCUMENTS

| | | | | | |
|---|---|---|---|---|---|
| 3,628,880 | A | * | 12/1971 | Smuland ................. | F01D 5/189 415/175 |
| 3,736,069 | A | * | 5/1973 | Beam, Jr. ................ | F01D 9/041 415/115 |
| 4,303,371 | A | | 12/1981 | Eckert | |
| 4,986,737 | A | * | 1/1991 | Erdmann .............. | B23P 15/006 416/190 |

(Continued)

FOREIGN PATENT DOCUMENTS

EP    2466074 A1    6/2012

OTHER PUBLICATIONS

U.S. Appl. No. 15/212,337, filed Jul. 18, 2016.

*Primary Examiner* — Kenneth Bomberg
*Assistant Examiner* — Adam W Brown
(74) *Attorney, Agent, or Firm* — Dority & Manning, P.A.

(57) ABSTRACT

Shrouds and shroud segments for gas turbine engines are provided. In one exemplary aspect, a gas turbine engine includes a first rotor blade stage and a second rotor blade stage. The gas turbine engine also includes a shroud formed from a plurality of shroud segments that each have a body and a vane extending from the body. The vane is disposed within the flow path between the first rotor blade stage and the second rotor blade stage to form at least a portion of a nozzle stage. Further, the body of the shroud segment defines an outer wall of the flow path and spans from the first rotor blade stage to the second rotor blade stage. An impingement baffle segment couples the shroud segment with a casing of the gas turbine engine.

19 Claims, 9 Drawing Sheets

(56) References Cited

U.S. PATENT DOCUMENTS

| | | | |
|---|---|---|---|
| 5,630,700 | A | 5/1997 | Olsen et al. |
| 5,639,212 | A * | 6/1997 | Schaefer ............... F01D 11/001 |
| | | | 415/173.1 |
| 6,530,744 | B2 * | 3/2003 | Liotta .................... F01D 9/041 |
| | | | 415/115 |
| 6,893,214 | B2 | 5/2005 | Alford et al. |
| 6,905,301 | B2 * | 6/2005 | Tiemann ................. F01D 5/189 |
| | | | 415/115 |
| 6,935,836 | B2 * | 8/2005 | Ress, Jr. ............... F01D 11/025 |
| | | | 415/173.2 |
| 7,186,078 | B2 | 3/2007 | Tanaka |
| 7,329,087 | B2 | 2/2008 | Cairo et al. |
| 7,445,425 | B2 | 11/2008 | Ferra et al. |
| 7,740,442 | B2 | 6/2010 | Lee et al. |
| 8,147,192 | B2 | 4/2012 | Jones et al. |
| 8,206,100 | B2 * | 6/2012 | Schuler .................. F01D 25/06 |
| | | | 415/119 |
| 8,240,980 | B1 | 8/2012 | Liang |
| 8,622,693 | B2 | 1/2014 | Di Paola et al. |
| 8,753,073 | B2 | 6/2014 | Albers et al. |
| 8,814,507 | B1 | 8/2014 | Campbell et al. |
| 9,169,736 | B2 | 10/2015 | Hayford et al. |
| 9,255,487 | B2 | 2/2016 | Mayer et al. |
| 9,500,095 | B2 | 11/2016 | Pietrobon et al. |
| 9,896,951 | B2 * | 2/2018 | Facchinetti ............. F01D 5/189 |
| 2014/0271144 | A1 | 9/2014 | Landwehr et al. |
| 2015/0204447 | A1 | 7/2015 | Kloepfer |
| 2017/0044919 | A1 | 2/2017 | Pietrobon et al. |

* cited by examiner

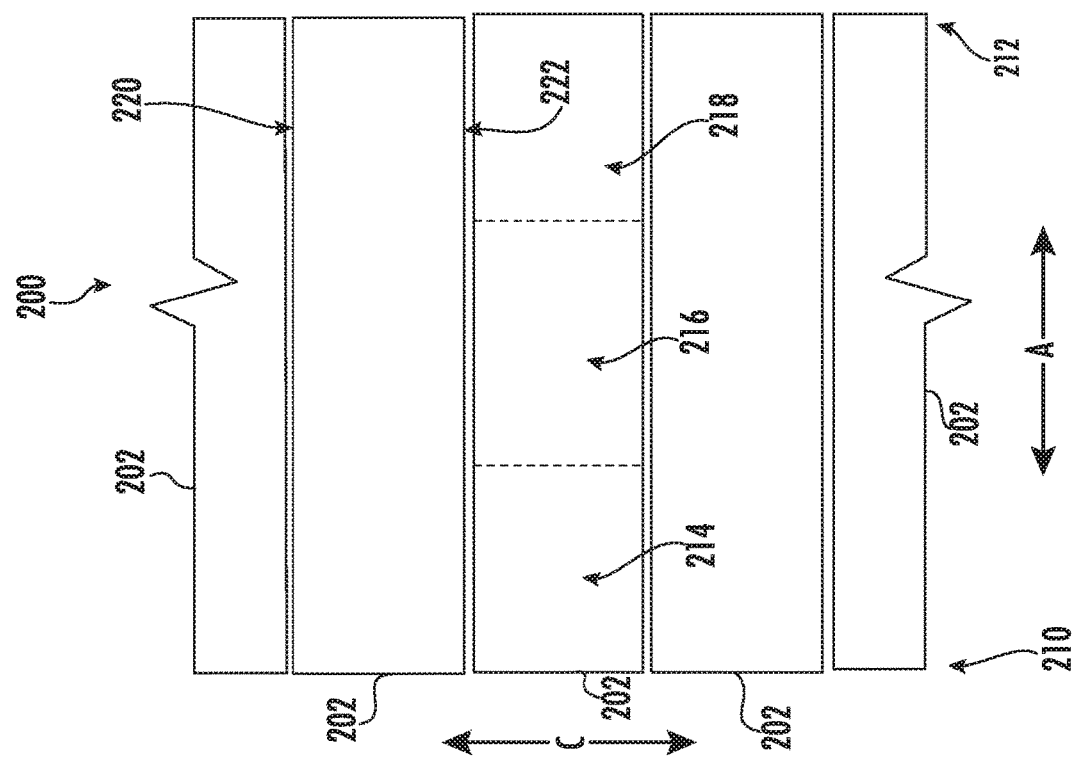
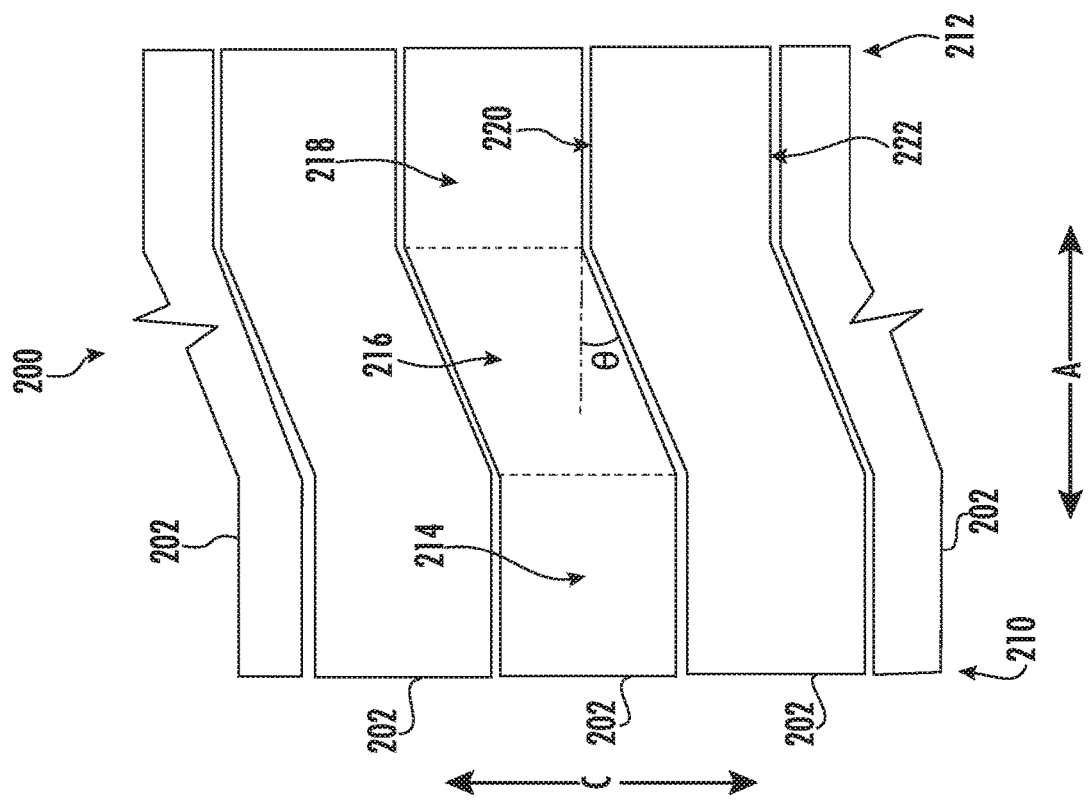

SHROUD FOR A GAS TURBINE ENGINE

FIELD

The present subject matter relates generally to turbine engines and particularly to shrouds for gas turbine engines.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Some gas turbine engines include multiple stator vane or nozzle stages and rotor blades stages. A typical stage of rotor blades, such as a turbine rotor blade stage, includes a shroud positioned radially outward from a platform of each blade, near the tips of the blades. Similarly, a typical stage of stator vanes or nozzles, such as a turbine nozzle stage, includes an outer band positioned radially outward from an inner band at the radially outer end of each nozzle. At the axial interface between adjacent blade and nozzle stages, a gap exists between the shroud of the rotor blade stage and the outer band of the nozzle stage. In multistage engines where the nozzle stages are interspersed with the rotor blade stages, one gap exists between the outer band of the nozzle stage and the shroud forward of the outer band and one gap exists between the outer band of the nozzle stage and the shroud aft of the outer band. As such, fluid flowing within or around the stages, such as combustion gases flowing through the stages of the turbine section, may leak through the gaps between the shrouds and the outer bands, which can impact engine performance and efficiency. Moreover, in some instances, the shrouds and outer bands can become misaligned, which may impede chargeable airflow through the core of the gas turbine engine, impacting engine performance and efficiency.

Therefore, an improved interface between a rotor blade stage and a nozzle stage of a gas turbine engine would be desirable. In particular, a shroud that addresses one or more of the challenges noted above would be advantageous.

BRIEF DESCRIPTION

Aspects and advantages of the invention will be set forth in part in the following description, or may be obvious from the description, or may be learned through practice of the invention.

In one exemplary embodiment of the present disclosure, a turbine engine defining a flow path is provided. The turbine engine includes a first rotor blade stage and a second rotor blade stage positioned downstream of the first rotor blade stage. The turbine engine also includes a shroud that includes a shroud segment. The shroud segment includes a body and a vane, the vane extending from the body and disposed within the flow path between the first rotor blade stage and the second rotor blade stage to form at least a portion of a nozzle stage. The body of the shroud segment defines an outer wall of the flow path and spans from the first rotor blade stage to the second rotor blade stage.

In another exemplary embodiment of the present disclosure, a method for assembling a turbine engine is provided. The turbine engine defines a flow path, an axial direction, a radial direction, and a circumferential direction. The turbine engine includes a casing. The method includes assembling a module, the module includes an impingement baffle segment, a module casing, and a shroud segment that includes a body and a nozzle segment having a vane extending from the body, wherein the shroud segment is coupled with the impingement baffle segment and the impingement baffle segment is coupled with the module casing. The method also includes positioning the module such that the vane is positioned within the flow path adjacent a first rotor blade stage to form at least a portion of a nozzle stage, and wherein the body of the shroud segment defines an outer wall of the flow path. Further, the method includes coupling the module casing with the casing. The method also includes positioning one or more rotor blades adjacent the nozzle stage to form at least a portion of a second rotor blade stage, and wherein the body of the shroud segment spans from the first rotor blade stage to the second rotor blade stage along the axial direction.

In a further exemplary embodiment of the present disclosure, a gas turbine engine is provided. The gas turbine engine defines a flow path, an axial direction, a radial direction, and a circumferential direction. The gas turbine engine includes a first rotor blade stage comprised of a plurality of rotor blades. The gas turbine engine also includes a second rotor blade stage spaced from the first rotor blade stage along the axial direction and comprised of a plurality of rotor blades. Moreover, the gas turbine engine also includes a shroud that includes a shroud segment. The shroud segment includes a body extending along the axial direction and a vane extending from the body along the radial direction. The vane is disposed within the flow path between the first rotor blade stage and the second rotor blade stage to form at least a portion of a nozzle stage therebetween. The body of the shroud segment defines an outer wall of the flow path and spans from the first rotor blade stage to the second rotor blade stage. The gas turbine engine further includes a casing and an impingement baffle that includes an impingement baffle segment, the impingement baffle segment coupling the shroud segment with the casing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 provides a top view of a plurality of shroud segments of the shroud of FIG. 3;

FIG. 5 provides a top view of another embodiment of a plurality of shroud segments according to an exemplary embodiment of the present disclosure;

DETAILED DESCRIPTION

Figure 1:
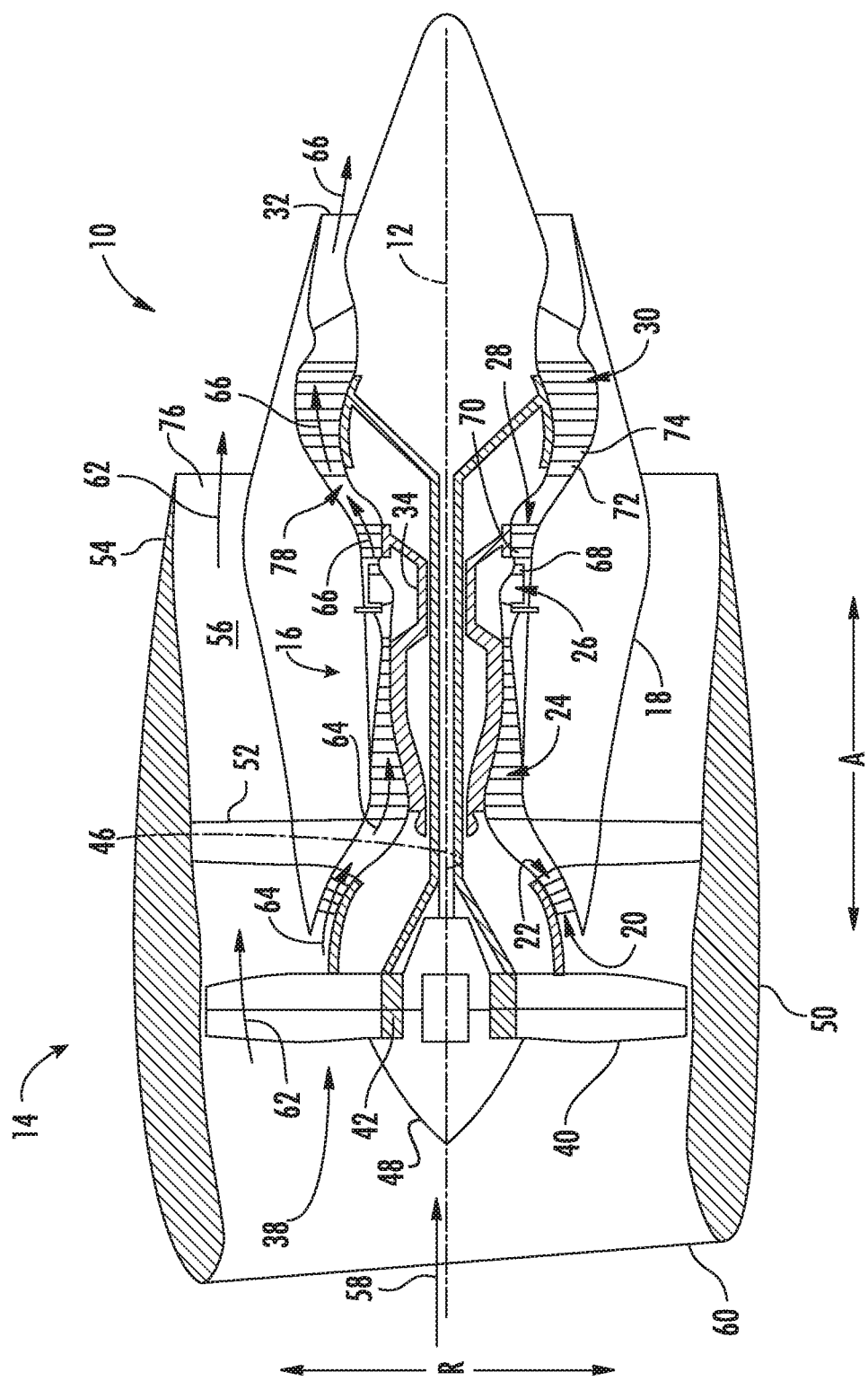
FIG. 1 provides a schematic cross-sectional view of an exemplary gas turbine engine according to various embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine exhaust nozzle, or a component being relatively closer to the engine exhaust nozzle as compared to another component. The terms "radial" or "radially" refer to a dimension extending between a center longitudinal axis of the engine and an outer engine circumference. Moreover, as used herein, the term "proximately radially outward" or "proximately radially inward" when used to describe a spatial relationship of an object with respect to a nozzle airfoil or a rotor blade airfoil is taken to mean that the stated object is within at least half a chord line from either of the leading or trailing edge of the airfoil along the radial direction. The chord line is the distance between the leading edge and the trailing edge of the airfoil.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

In general, the present disclosure is directed to a shroud for a gas turbine engine that includes features for eliminating or reducing flow path leakage between adjacent stages of nozzles and rotor blades, eliminates the need for individual shroud hangers, reduces the risk of adjacent hardware contact, reduces the chargeable flow requirement, and reduces the weight and part count of the gas turbine engine. More particularly, in one exemplary aspect, a gas turbine engine includes a first rotor blade stage and a second rotor blade stage. The gas turbine engine also includes a shroud formed from a plurality of shroud segments that each have a body and a vane extending from the body. The vane is disposed within the flow path between the first rotor blade stage and the second rotor blade stage to form at least a portion of a nozzle stage. Further, the body of the shroud segment defines an outer wall of the flow path and spans from the first rotor blade stage to the second rotor blade stage. An impingement baffle segment couples the shroud segment with a casing of the gas turbine engine.

FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal axis or centerline 12 provided for reference) and a radial direction R. In general, the turbofan 10 includes a fan section 14 and a core turbine or gas turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. Fan blades 40 and disk 42 are together rotatable about the longitudinal axis 12 by LP shaft 36. In some embodiments, the fan blades 40 and disk 42 are rotatable across a power gear box 46 that includes a plurality of gears for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, reverse-flow engines, industrial and marine gas turbine engines, steam turbine engines, as well as auxiliary power units.

Figure 2:
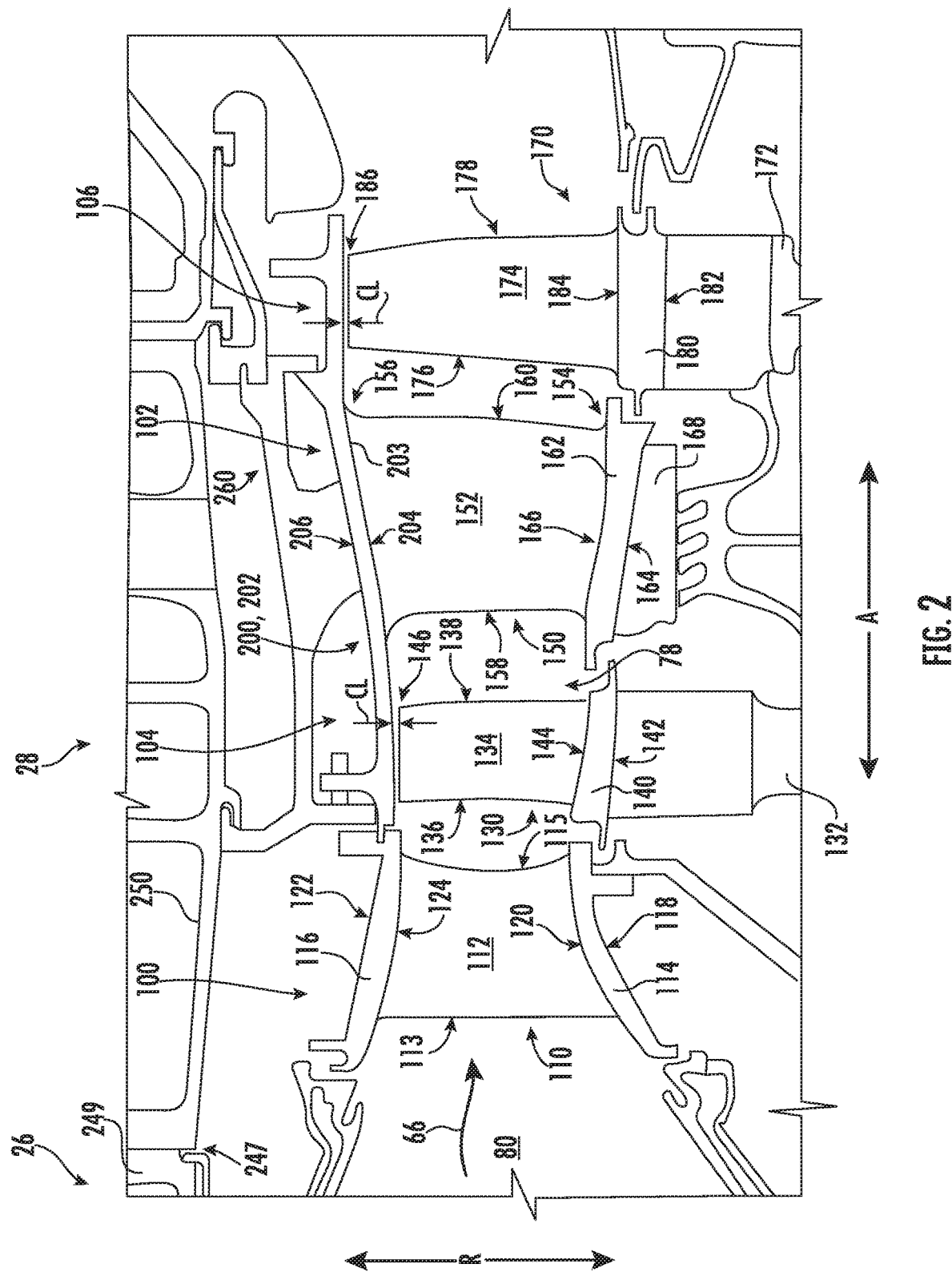
FIG. 2 provides a close up, side view of a portion of a turbine section of the gas turbine engine of FIG. 1.

FIG. 2 provides a schematic view of the HP turbine 28 of the turbine section of the gas turbine engine 10 of FIG. 1. FIG. 2 also depicts the aft end of the combustion section 26. As shown, the combustion section 26 generally includes a combustor defining a combustion chamber 80. A mixture of fuel and air is combusted within the combustion chamber 80 to generate a flow of combustion gases 66, as previously noted. Downstream of the combustion section 26, the HP turbine 28 includes a plurality of turbine stages. Each turbine stage includes a plurality of turbine components that define and/or are positioned within the hot gas path 78 through which the combustion gases 66 flow.

More particularly, for the embodiment depicted in FIG. 2, HP turbine 28 includes a plurality of turbine nozzle stages and a plurality of turbine rotor blade stages. Specifically, the HP turbine 28 includes a first turbine nozzle stage 100 and a second turbine nozzle stage 102 each configured to direct a flow of combustion gasses 66 therethrough. Notably, the first nozzle stage 100 is located immediately downstream of the combustion section 26, and thus may also be referred to as a combustor discharge nozzle stage having a plurality of combustion discharge nozzle segments. Moreover, the HP turbine 28 also includes a first rotor blade stage 104 and a second rotor blade stage 106. Accordingly, for this embodiment, the HP turbine 28 includes a first stage that includes first nozzle stage 100 and first rotor blade stage 104 and a second stage that includes second nozzle stage 102 and second rotor blade stage 106.

The first nozzle stage 100 includes a plurality of turbine nozzle segments 110 spaced along the circumferential direction C, which is into an out of the page in FIG. 2. Each first turbine nozzle segment 110 forming the first nozzle stage 100 includes one or more first stage turbine stator vanes 112 positioned within the hot gas path 78 (only one first stage nozzle vane 112 is shown in FIG. 2). Each vane 112 has a concave pressure side opposite a convex suction side. As such, pressure and suction sides of each vane 112 generally define an airfoil shape. Opposite pressure and suction sides of each vane 112 extend radially along a span from a radially inner nozzle end to a radially outer nozzle end. Moreover, pressure and suction sides of vane 112 extend axially between a leading edge 113 and an opposite trailing edge 115.

Further, each nozzle segment 110 includes an inner band 114 defining an inner wall of the nozzle segment 110 and an outer band 116 defining an outer wall of the nozzle segment 110, with vane 112 extending generally along the radial direction R between the inner band 114 and the outer band 116. Inner band 114 of the first nozzle segment 110 defines a cold side 118 and an opposite hot side 120. The hot side 120 is exposed to and at least partially defines the hot gas path 78. Similarly, the outer band 116 of the first nozzle segment 110 defines a cold side 122 and an opposite hot side 124. The hot side 124 is exposed to and at least partially defines the hot gas path 78. Together, the plurality of first turbine nozzle segments 110 define the first nozzle stage 100, with an inner wall defined by the plurality of inner bands 114 of nozzle segments 110, an outer wall defined by the plurality of outer bands 116 of nozzle segments 110, and a plurality of vanes 112 extending between the inner and outer bands 114, 116.

The first rotor blade stage 104 is adjacent to and located immediately downstream of the first nozzle stage 100 and immediately upstream of the second nozzle stage 102. The first rotor blade stage 104 includes a plurality of turbine rotor blades 130 spaced apart from one another along the circumferential direction C. The first rotor blade stage 104 also includes a first stage rotor 132. Each turbine rotor blade 130 has an airfoil 134 extending axially between a leading edge 136 and a trailing edge 138. Further, each rotor blade 130 is attached to the first stage rotor 132. Although not depicted, the first stage turbine rotor 132 is, in turn, connected to the HP shaft 34 (FIG. 1). In this way, the turbine rotor blades 130 may extract kinetic energy from the flow of combustion gases 66 through the hot gas path 78 defined by the HP turbine 28 as rotational energy applied to the HP shaft 34.

Similar to the plurality of nozzle segments 110 forming the first nozzle stage 100, a radially inner portion of each turbine rotor blade 130 includes an inner wall or platform 140. The platform 140 of each turbine rotor blade 130 defines a cold side 142, as well as an opposite hot side 144 exposed to and at least in part defining the hot gas path 78. Additionally, each turbine rotor blade 130 includes a tip 146 at a radially outer portion of the blade.

As further shown in FIG. 2, the HP turbine section 28 of the core gas turbine engine 16 (FIG. 1) includes a shroud 200. During operation, the shroud 200 is exposed to combustion gases 66 and at least partially defines the hot gas path 78. Shroud 200 is radially spaced from the blade tips 146 of the rotor blades 130 such that a radial or clearance gap CL is defined between tips 146 and shroud 200. That is, shroud 200 is positioned radially adjacent blades 130 to define an outer wall of the first rotor blade stage 104.

Shroud 200 may be formed of one or more shroud segments 202. In some embodiments, for example, shroud 200 may be formed of a single shroud segment 202 that forms a continuous, unitary, or seamless three hundred sixty degree (360°) ring about the longitudinal engine axis 12 (FIG. 1). In yet other embodiments, shroud 200 may be formed from a plurality of shroud segments 202 spaced along the circumferential direction C. For this embodiment, for instance, shroud 200 includes a plurality of shroud segments 202 positioned next to one another along the circumferential direction C to form generally annular shroud 200 around first rotor blade stage 104, second rotor blade stage 106, and forms the second stage nozzle stage 102 as will be explained further below.

Shroud segment 202 includes a body 203 having an inner surface 204 opposite an outer surface 206. Outer surface 206 is a cold side surface of the body 203 of shroud segment 202, and inner surface 204, which is exposed to and at least in part defines the hot gas path 78, is a hot side surface of the body 203 of the shroud segment 202. Accordingly, the clearance gaps CL are defined between blade tips 146 and the inner surface 204 of the body 203 of the shroud segment 202 of shroud 200. As depicted in FIG. 2, the body 203 of the shroud segment 202 is tightly configured relative to the blades 130 so that the body 203 defines an outer radial flow path boundary for the hot combustion gas flowing through the HP turbine 28. It is generally desirable to minimize the clearance gap CL between the blade tips 146 and the body 203, particularly during cruise operation of the turbofan 10 (FIG. 1), to reduce leakage from the hot gas path 78 over the blade tips 146 and through the clearance gaps CL.

The second nozzle stage 102 is adjacent to and located immediately downstream of the first rotor blade stage 104 and adjacent to and located immediately upstream of the second rotor blade stage 106. Thus, the second nozzle stage 102 is positioned between the first rotor blade stage 104 and the second rotor blade stage 106 along the axial direction A. The second nozzle stage 102 is formed by a plurality of second stage turbine nozzle segments 150 that are each attached to or integral with the body 203 of a corresponding shroud segment 202 of shroud 200 and are positioned along or within the hot gas path 78 of the HP turbine 28. That is, each shroud segment 202 includes a nozzle segment 150 extending inward along the radial direction R from body 203. More particularly, each second turbine nozzle segment 150 forming the second nozzle stage 102 includes one or more second stage turbine stator vanes 152 positioned within the flow path e.g., the hot gas path 78 (only one second stage nozzle vane 152 is shown in FIG. 2). Each vane 152 is attached to or integral with the body 203 of a corresponding shroud segment 202. In some embodiments, the vane 152 is unitarily formed with the body 203. In addition, each vane 152 has a concave pressure side opposite a convex suction side. As such, pressure and suction sides of each vane 152 generally define an airfoil shape. Opposite pressure and suction sides of each vane 152 extend radially along a span from a radially inner end 154 to a radially outer end 156. Moreover, pressure and suction sides of vane 152 extend axially between a leading edge 158 and an opposite trailing edge 160.

Further, each nozzle segment 150 of the second nozzle stage 102 includes an inner band 162 defining an inner wall of the nozzle segment 150 and the body 203 of the shroud segment 202 is positioned to define an outer wall of second nozzle stage 102, as noted above. Each vane 152 extends generally along the radial direction R between the inner band 162 and the body 203. In some embodiments, the inner band 162 is unitarily formed with vane 156, which is in turn unitarily formed with the body 203. Further, each inner band 162 of the second nozzle stage 102 defines a cold side 164 and an opposite hot side 166, which is exposed to and at least partially defines the hot gas path 78. Moreover, a honeycomb structure 168 is shown affixed to the inner band 162, and more particularly, the cold side 164 of the inner band 162. A radially inner surface of the honeycomb structure 168 interacts with sealing fins of a labyrinth seal as shown. In addition, the plurality of inner bands 142 together define an inner wall of the second nozzle stage 102. Further, radially outward from inner band 162, inner surface 204 of the body 203 defines a hot side of second nozzle stage 102 and outer surface 206 of the body 203 defines a cold side. As discussed above, the inner surface 204 of body 203 is exposed to and at least partially defines the hot gas path 78. Accordingly, the inner surface 204 of the body 203 of the shroud 200 at least partially defines the hot gas path 78 through the first turbine blade stage 122 and the second nozzle stage 102.

The second rotor blade stage 106 is adjacent to and located immediately downstream of the second nozzle stage 102. The second rotor blade stage 106 includes a plurality of turbine rotor blades 170 spaced apart from one another along the circumferential direction C. The second rotor blade stage 106 also includes a second stage rotor 172. Each turbine rotor blade 170 has an airfoil 174 extending axially between a leading edge 176 and a trailing edge 178. Further, each rotor blade 170 is attached to the second stage rotor 172. Although not depicted, the second stage turbine rotor 172 is, in turn, connected to the HP shaft 34 (FIG. 1). In such manner, the turbine rotor blades 170 may extract kinetic energy from the flow of combustion gases 66 through the hot gas path 78 defined by the HP turbine 28 as rotational energy applied to the HP shaft 34.

A radially inner portion of each turbine rotor blade 170 includes an inner wall or platform 180. The platform 180 of each turbine rotor blade 170 defines a cold side 182, as well as an opposite hot side 184 exposed to and at least in part defining the hot gas path 78. Additionally, each turbine rotor blade 170 includes a tip 186 at a radially outer portion of the blade. As depicted in FIG. 2, the body 203 of the shroud 200 is radially spaced from the blade tips 186 such that a radial or clearance gap CL is defined between tips 186 and the body 203 of the shroud 200. In this way, the body 203 of the shroud 200 is positioned radially adjacent blades 170 to define an outer wall of the second rotor blade stage 106. In particular, the clearance gaps CL are defined between blade tips 186 and the inner surface 204 of the body 203 of the shroud 200. Accordingly, the inner surface 204 of the body 203 of shroud 200 at least partially defines the hot gas path 78 through the first turbine rotor blade stage 122, the second nozzle stage 102, and the second turbine blade rotor stage 124.

Shroud 200 generally forms a ring or shroud around a first stage of rotor blades, a stage of nozzles adjacent the first stage of rotor blades, and a second stage of rotor blades, e.g., shroud 200 may extend circumferentially about the longitudinal engine axis 12 (FIG. 1) proximate a first turbine rotor blade stage, a turbine nozzle stage, and a second turbine rotor blade stage. In the depicted exemplary embodiment of FIG. 2, shroud 200 is an annular shroud that extends circumferentially around the first rotor blade stage 104, the second rotor blade stage 106, and extends around and forms the second stage nozzle stage 102. In some embodiments, the shroud 200 is formed of a ceramic matrix composite (CMC) material. In some other embodiments, the shroud 200 is formed of another suitable composite material, such as e.g., a polymer matrix composite (PMC) material. In yet further embodiments, the shroud 200 is formed of a metallic material (e.g., a high temperature nickel alloy) or another suitable material. Shroud will be explained in further detail below.

Figure 3:
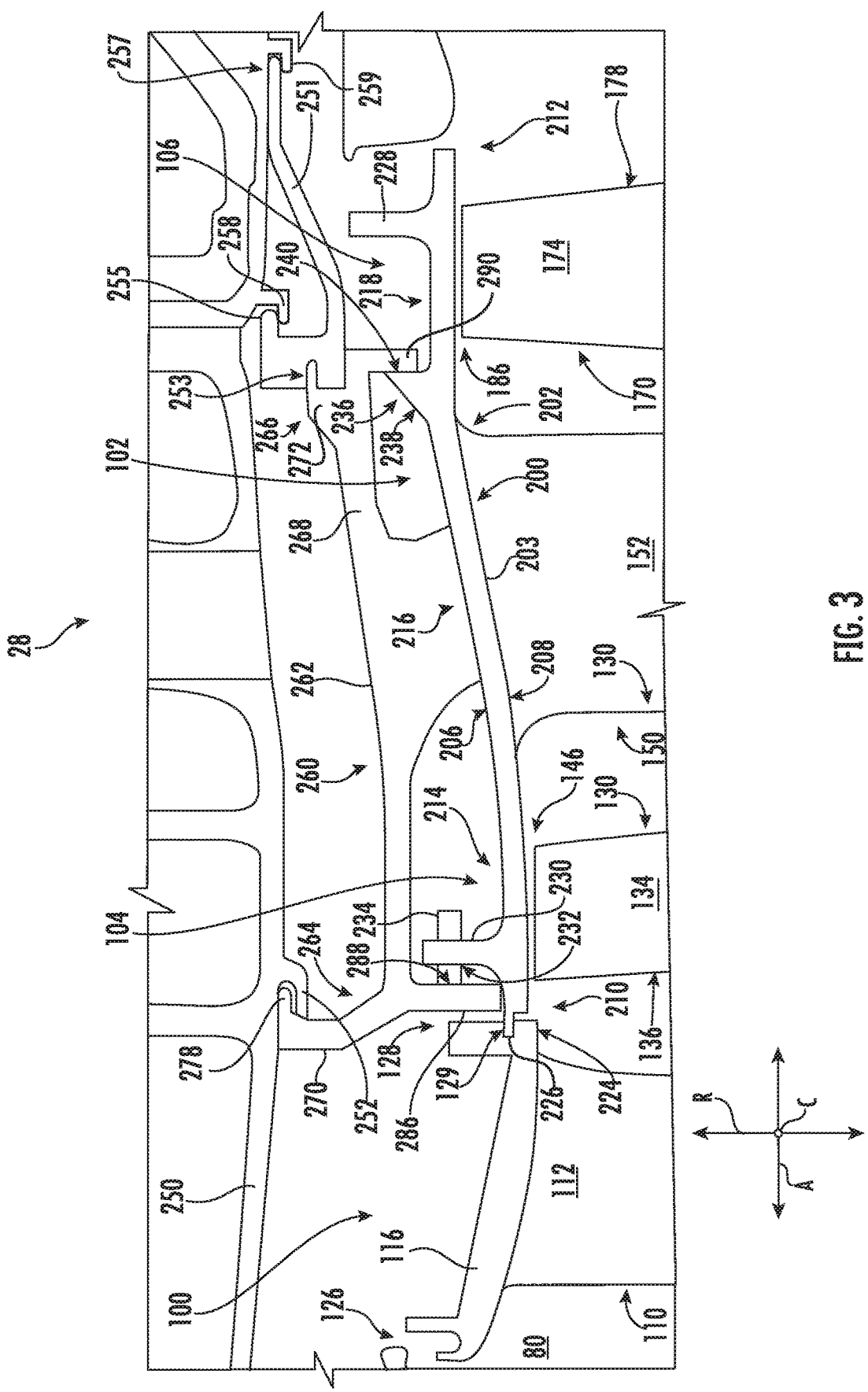
FIG. 3 provides a close up, schematic view of a shroud of FIG. 2.

FIG. 3 provides a close up view of the shroud 200 of FIG. 2 that is formed of a plurality of shroud segments 202 spaced along the circumferential direction C (only one shroud segment 202 is shown in FIG. 3). As shown, each shroud segment 202 includes body 203 that extends between a first end 210 and a second end 212 along the axial direction A. In the depicted embodiment of FIG. 3, the first end 210 is a forward end of the body 203 of shroud segment 202 and the second end 212 is an aft end. Stated alternatively, the first end 210 is positioned upstream of the second end 212.

Furthermore, as shown in FIG. 3, the body 203 of the shroud segment 202 defines an outer wall of the flow path, which in this embodiment is hot gas path 78. As shown, the first end 210 of the body 203 of shroud segment 202 is positioned outward from the tips 146 of the rotor blades 130 of the first rotor blade stage 104 along the radial direction R and the second end 212 of the body 203 of the shroud segment 202 is positioned outward from the tips 186 of the rotor blades 170 of the second rotor blade stage 106 along the radial direction R. As such, the body 203 defines a radially outer wall of the first rotor blade stage 104, the second nozzle stage 102, and the second rotor blade stage 106.

In addition, as shown in FIG. 3, the body 203 of shroud segment 202 spans from the first rotor blade stage 104 to the second rotor blade stage 106. More particularly, for this embodiment, the body 203 spans from the first rotor blade stage 104 to the second rotor blade stage 106 along the axial direction A. More particularly still, the body 203 of the shroud segment 202 spans at least from the leading edges 136 of the plurality of rotor blades 130 of the first rotor blade stage 104 to the trailing edges 178 of the plurality of rotor blades 170 of the second rotor blade stage 106. Further, for this embodiment, the body 203 of shroud segment 202 terminates at its first end 210 upstream of the leading edge 136 of the most forward rotor blade 130 of the first rotor blade stage 104 and downstream of the trailing edge 115 (FIG. 2) of the aft most vane 112 of the first nozzle stage 100 and the body 203 of shroud segment 202 terminates at its second end 212 downstream of the trailing edge 178 of the aft most rotor blade 170 of the second rotor blade stage 106.

Further, as shown in FIG. 3, the body 203 of shroud segment 202 includes a first portion 214 positioned radially outward of the rotor blades 130 of the first rotor blade stage 104 along the axial direction A, a second portion 218 positioned radially outward of the rotor blades 170 of the second rotor blade stage 106 along the axial direction A, and a middle portion 216 disposed therebetween and connecting the first portion 214 and the second portion 218 and extending along the second nozzle stage 102 along the axial direction A. In this way, the first portion 214 defines an outer wall of the first rotor blade stage 104, the middle portion 216 defines an outer wall of the second nozzle stage 102, and the second portion 218 defines an outer wall of the second rotor blade stage 106. Moreover, for this embodiment, the body 203 of shroud segment 202 is formed of a single, continuous piece that extends axially from its first end 210 to its second end 212.

FIG. 4 provides a top view of a plurality of shroud segments 202 of the shroud 200 of FIG. 3. FIG. 5 provides a top view of another embodiment of a plurality of shroud segments 202 according to an exemplary embodiment of the present disclosure. As shown in FIG. 4, the body 203 of each shroud segment 202 extends between a first side 220 and a second side 222 along the circumferential direction C. Moreover, as shown in the depicted embodiment of FIG. 4, the middle portion 216 of the body 203 of each shroud segment 202 is angled with respect to the axial direction A and the first and second portions 214, 216 are oriented along the axial direction A. That is, the middle portion 216 is angled with respect to the axial direction A by an angle θ and the first side 220 and the second side 222 of the body 203 of each of the shroud segments 202 are oriented substantially along the axial direction A along the first portion 214 and the second portion 218 of the bodies 203 of the segments 202. In some embodiments, for example, the angle θ may be about thirty degrees (30°), with the term "about" meaning within plus or minus five degrees from the stated value. In some embodiments, the angle θ may be about forty-five degrees (45°). In yet other embodiments, as shown in FIG. 5, the first, middle, and second portions 214, 216, 218 are oriented substantially along the axial direction A, with the term "substantially" meaning within five degrees (5°) of the stated value. That is, in such embodiments, the first, middle, and second portions 214, 216, 218 of the bodies 203 of the shroud segments 202 are generally not angled with respect to the axial direction A.

Returning to FIG. 3, as shown, the body 203 of the shroud segment 202 is coupled with the outer band 116 of the nozzle segment 110 of the first nozzle stage 100 at an axial expansion joint 224. As depicted in FIG. 3, the outer band 116 extends between a first end 126 and a second end 128 along the axial direction A. Moreover, as shown, the outer band 116 defines a cutout 129. More particularly, outer band 116 defines cutout 129 at its second end 128. As further depicted in FIG. 3, the body 203 of shroud segment 202 includes an angel wing or tenon 226 extending from body 203 at its first end 210. The tenon 226 of the body 203 is shaped complementary to the cutout 129 defined by the outer band 116 and is inserted into the cutout 129 to constrain the shroud segment 202 in the axial and radial directions A, R. The tenon 226 and cutout 129 can be configured such that the cutout 129 defined by the outer band 116 extends a distance along the axial direction A that is greater than the axial length of the tenon 226. In this way, various components that are directly or indirectly coupled with the shroud segment 202 can thermally expand during operation of the turbofan 10 (FIG. 1). That is, the extra length of the cutout 129 allows for relative axial movement between the shroud segment 202 and the outer band 116 to accommodate the different thermal growth rates of various materials.

The coupling of the shroud segment 202 with the outer band 116 prevents combustion gases 66 from leaking therebetween, prevents the first end 210 of the shroud segment 202 from dropping into the hot gas path 78 due to pressure, thermal, and aero loads applied on the shroud 200 during operation of the turbofan (FIG. 1), and the axial expansion joint 224 allows for thermal expansion of various components without unduly stressing the shroud segment 202, particularly where the shroud 200 and its plurality of shroud segments 202 are formed of a CMC material and components coupling and interfacing with the CMC shroud segments 202 are metallic components.

As further shown in FIG. 3, an anti-chording beam 228 extends from the outer surface 206 of the body 203 of shroud segment 202. More particularly, the anti-chording beam 228 extends radially outward from the outer surface 206 of body 203 proximate its second end 212. More particularly still, the anti-chording beam 228 extends radially outward from the outer surface 206 of the shroud segment 202 radially outward from the trailing edge 178 of the rotor blades 170 of the second rotor blade stage 106 along the axial direction A. The anti-chording beam 228 functions to stiffen the shroud segment 202 and prevents deflection during operation of the turbofan 10 (FIG. 1).

With reference still to FIG. 3, as shown, the shroud segment 202 of shroud 200 is coupled with a casing 250 positioned outward of the shroud 200 along the radial direction R by an impingement baffle 260. For the depicted embodiment of FIG. 3, the casing 250 is an HP turbine casing. The impingement baffle 260 can be formed of a metallic material or another suitable material. The impingement baffle 260 generally forms a ring around the shroud 200. The impingement baffle 260 is formed of one or more impingement baffle segments 262 spaced along the circumferential direction C. For instance, in some embodiments, the impingement baffle 260 is formed of a single, continuous segment that extends three hundred sixty degrees (360°) around the circumferential direction C. In yet other embodiments, such as the depicted embodiment of FIG. 3, the impingement baffle 260 includes a plurality of impingement baffle segments 262 positioned adjacent one another along the circumferential direction C (only one impingement baffle segment 262 is depicted in FIG. 3). Each of the impingement baffle segments 262 couple a corresponding shroud segment 202 with the casing 250.

Each impingement baffle segment 262 of the impingement baffle 260 extends between a first end 264 and a second end 266 along the axial direction A. As shown, the impingement baffle segment 262 includes an axial member 268 that extends generally between the first end 264 and the second end 266 of the impingement baffle segment 262. At the first end 264, the impingement baffle segment 262 includes a first arm 270 that extends outward from the axial member 268 along the radial direction R and couples the impingement baffle segment 262 with the casing 250. In particular, the first arm 270 includes a hook 278 that is inserted into a groove defined by a hook 252 of the casing 250.

Additionally, at the first end 264 of the impingement baffle segment 262, a first flange 286 extends from the axial member 268 inward along the radial direction R. The first flange 286 defines an opening 288. As further shown, the body 203 of the shroud segment 202 includes a first flange 230 that defines an opening 232. A pin 234 inserted into the opening defined by the first flange 230 of the body 203 and into the opening 288 defined by the first flange 286 of the impingement baffle segment 262 couples the body 203 of the shroud segment 202 with the impingement baffle segment 262 at its first end 210. The pin 234 secures the body 203 with the impingement baffle segment 262, particularly in the radial direction R, and also prevents the first end 210 of the body 203 from dropping into the hot gas path 78 due to pressure, thermal, and aero loading on the shroud 200 during operation of the turbofan (FIG. 1).

At the second end 266, the impingement baffle segment 262 includes a second arm 272 that extends outward from the axial member 268 along the radial direction R and couples the impingement baffle segment 262 with the casing 250. More particularly, the second arm 272 of the impingement baffle segment 262 is coupled with the casing 250 by connecting to a ring 251 that is in turn connected to the casing 250. More particularly still, the second arm 272 includes a hook 280 that is inserted into a groove 253 defined by the ring 251. Furthermore, for this embodiment, the ring 251 extends between a first end (not labeled) and a second end 257 along the axial direction A. At the first end of the ring 251, the ring 251 includes a hook 255. The hook 255 of the ring 251 hooks into a groove defined by a first ring hook 258 that extends from casing 250. The second end 257 of the ring 251 is coupled with the casing 250 by a second ring hook 257 that extends from casing 250. More particularly, the second end 257 of the ring 251 is received within a groove defined by the second ring hook 259. In this way, the ring 251 is coupled with casing 250. In some embodiments, the ring 251 can be integral with the casing 250 such that the second arm 272 of the impingement baffle segment 262 connects directly with the casing 250. In yet other embodiments, the casing 250 includes a hook that defines a groove, and in such embodiments, the hook 280 of the second arm 272 is inserted into the groove such that the second end 266 of the impingement baffle segment 262 is coupled directly with the casing 250.

Notably, for this embodiment, the impingement baffle segment 262 is coupled with the casing 250 proximately radially outward of the rotor blades 130 of the first rotor blade stage 104 and the impingement baffle segment 262 is coupled with the casing 250 proximately radially outward of the rotor blades 170 of the second rotor blade stage 106. By coupling the impingement baffle segment 262 with the casing 250 at these locations, the clearances CL between the shroud 200 and the rotor blades 130, 170 can be independently controlled.

As further shown in FIG. 3, at the second end 266 of the impingement baffle segment 262, the impingement baffle segment 262 includes a second flange 290 that extends from the axial member 268 along the radial direction R. More particularly, the second flange 290 extends inward from the axial member 268 along the radial direction R. As further depicted in FIG. 3, the body 203 of the shroud segment 202 includes an axial stop 236 that is configured to interface with the second flange 290 of the impingement baffle segment 262. For this embodiment, the axial stop 236 has a triangular circumferential cross section that extends outward along the radial direction R from the outer surface 206 of the body 203 of the shroud segment 202. The axial stop 236 includes an angled wall 238 and an interface wall 240 that is oriented along the radial direction R. The angled wall 238 is angled with respect to the axial direction A so as to provide stiffness to the axial stop 136. During operation of the turbofan 10 (FIG. 1), the interface wall 240 of the axial stop 236 interfaces with the second flange 290 of the impingement baffle segment 262 to constrain the shroud segment 202 along the axial direction A, and particularly, the interface between the second flange 290 and the axial stop 236 prevents the shroud segment 202 from moving too far toward the second rotor blade stage 106 along the axial direction A. In some embodiments, the axial stop 236 and the second flange 290 can both define openings complementary to one another and a pin can couple the axial stop 236 with the second flange 290. In such embodiments, the pin further constrains the shroud segment 202 in the axial direction A and additionally constrains the shroud segment 202 in the radial direction R.

Figure 7:
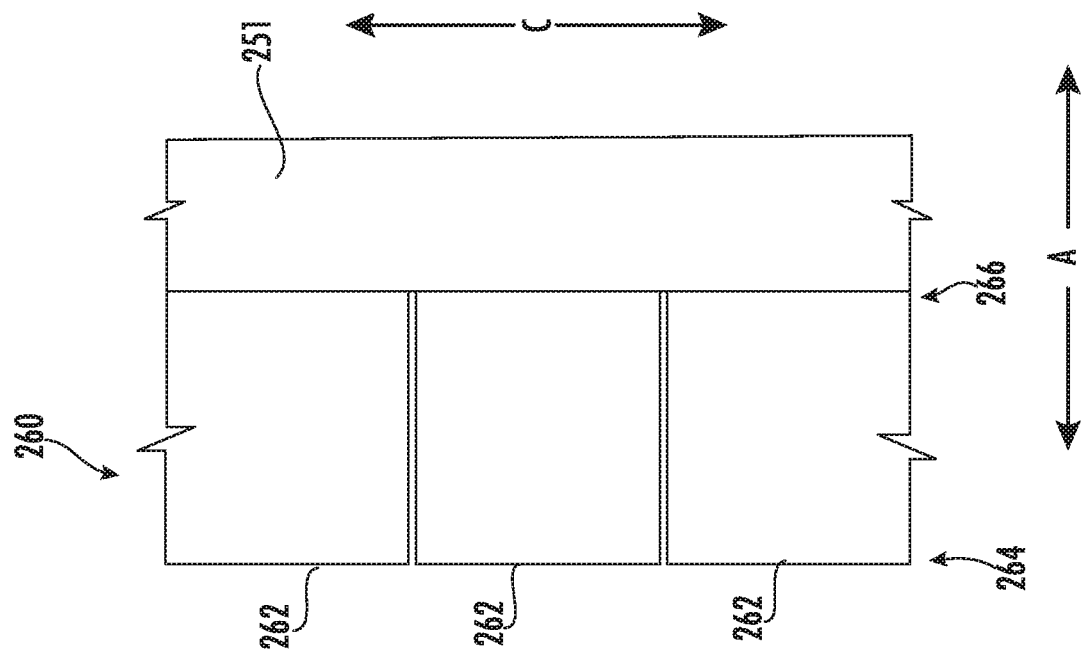
FIG. 7 provides a top view of another embodiment of a plurality of impingement baffle segments according to an exemplary embodiment of the present disclosure.
Figure 6:
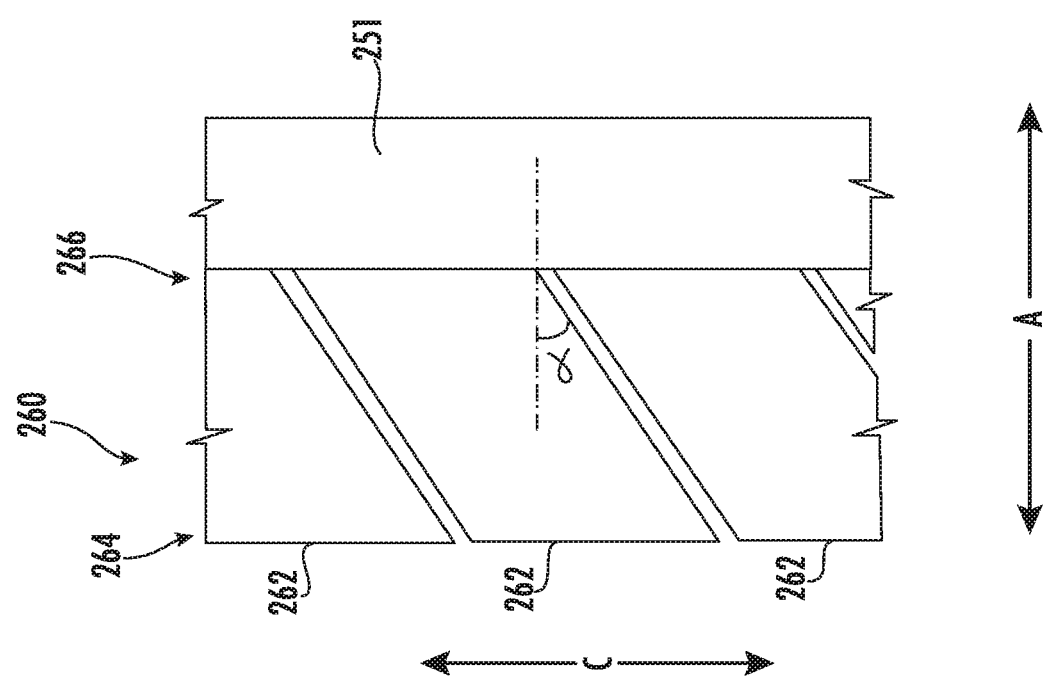
FIG. 6 provides a top view of a plurality of impingement baffle segments according to an exemplary embodiment of the present disclosure.

FIG. 6 provides a top view of a plurality of impingement baffle segments 262 of the impingement baffle 260 of FIG. 3 according to an exemplary embodiment of the present disclosure. FIG. 7 provides a top view of another embodiment of a plurality of impingement baffle segments 262 according to an exemplary embodiment of the present disclosure. As shown in FIG. 6, each of the impingement baffle segments 262 are angled with respect to axial direction A as they extend between their respective first and second ends 264, 266. That is, impingement baffle segments 262 is angled with respect to the axial direction A by an angle α. In this way, the impingement baffle segments 262 can follow the same or similar orientation of the body 203 of the shroud segments 202, such as e.g., the bodies 203 of the shroud segments 202 of FIG. 4. In some embodiments, for example, the angle α can be about thirty degrees (30°). In yet other embodiments, the angle α can be about forty-five degrees (45°). In some embodiments, as shown in FIG. 7, the impingement baffle segments 262 are substantially oriented along the axial direction A. In this manner, the impingement baffle segments 262 can follow the same or similar orientation of the bodies 203 of shroud segments 202, such as e.g., the shroud segments 202 of FIG. 5.

Figure 8:
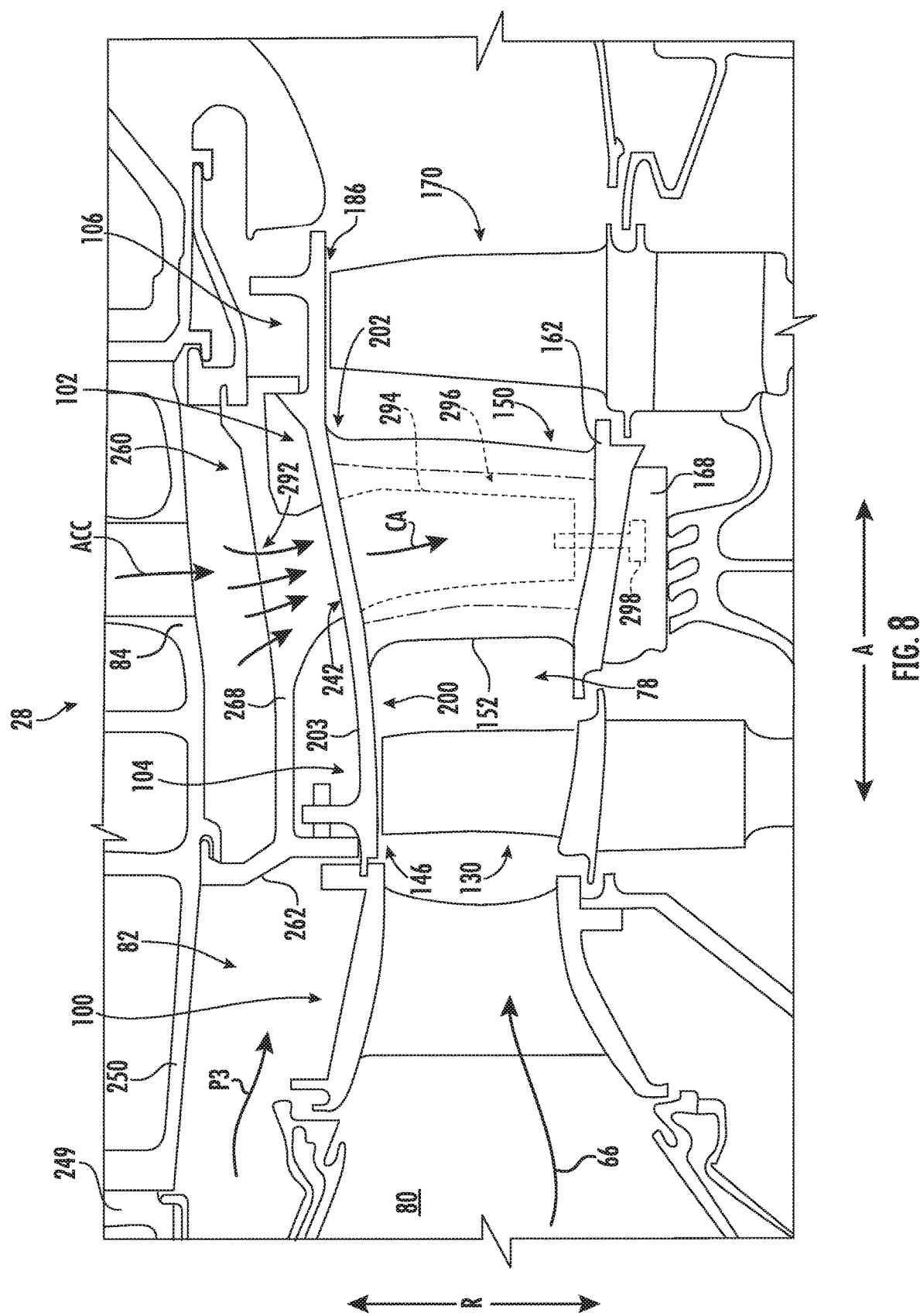
FIG. 8 provides a close up, side view of a portion of a turbine section of the gas turbine engine of FIG. 1 depicting an impingement baffle coupling a shroud segment with a casing.

FIG. 8 provides a close up, side view of a portion of turbine section 28 of the turbofan 10 of FIG. 1 depicting impingement baffle segment 262 in further detail. As shown, the axial member 268 of the impingement baffle segment 262 defines a plurality of openings 292 through which a cooling airflow CA can flow. The cooling airflow CA, which is relatively cool compared to the combustion gasses 66 flowing along the hot gas path 78, can be a mixture of compressor discharge air P3 and active clearance control impingement air ACC. The P3 air is discharged from the HP compressor 24 (FIG. 1) and a portion of the discharge air flows radially outward of the combustion chamber 80 through an outer plenum 82 defined between the outer combustion liner and an outer casing. The P3 air flows through outer plenum 82 along the axial direction A to HP turbine 28, where the P3 air can enter through the openings 292 in the impingement baffle segments 262 and/or mix with the ACC air and then can flow through the openings 292. The ACC air can be extracted from the bypass airflow passage 56 (FIG. 1) or another suitable location and can be supplied to the HP turbine 28 for cooling. The ACC air is delivered to the HP turbine 28 by a supply conduit 84. The ACC air can be used to impinge the impingement baffle 260 to control the clearances CL between the shroud 200 and the tips 146 of the rotor blades 130 of the first rotor blade stage 104 and the tips 186 of the rotor blades 170 of the second rotor blade stage 106. Additionally, as noted above, the ACC air can flow through the openings 292 of the impingement baffle segment 262 and/or can mix with the P3 air and then can flow through the openings 292. The impingement baffle segments 262 can each have generally hollow structures or can define a plurality of discrete cooling passages through which the cooling airflow CA can flow after flowing through the openings 292.

A strut member 294 (shown in dashed lines in FIG. 8) extends inward from the axial member 268 along the radial direction R. More particularly, the strut member 294 extends radially inward through an opening 242 defined by the body 203 of shroud segment 202 and into an internal cavity 296 defined by the vane 152 of the nozzle segment 150 of the second nozzle stage 102. For this embodiment, the strut member 294 is a generally hollow structure, thereby allowing the cooling airflow to flow through the openings 292 and radially inward toward the inner band 162 of the nozzle segment 150 of the second nozzle stage 102. As the cooling airflow CA flows radially inward, the air impinges on the internal walls of the vane 152 to cool the airfoil. In some embodiments, the strut member 294 can include perforated sidewalls along the radial length of the strut member 294 to allow for the cooling airflow CA to directly contact the walls of the vane 152 that define the internal cavity 296.

In addition, the strut member 294 of impingement baffle segment 262 also functions as a structural member and secures the vane 152 in place. As shown in FIG. 8, the strut member 294 extends radially inward into the internal cavity 296 of the vane 152 and can be coupled with the honeycomb structure 168. In particular, for this embodiment, the strut member 294 of the impingement baffle segment 262 is coupled with a mechanical fastener or pin 298 (shown in dashed lines in FIG. 8), which can be formed of a metallic material, for example. The strut member 294 can be coupled with the honeycomb structure 168 in other suitable manners as well.

Figure 9:
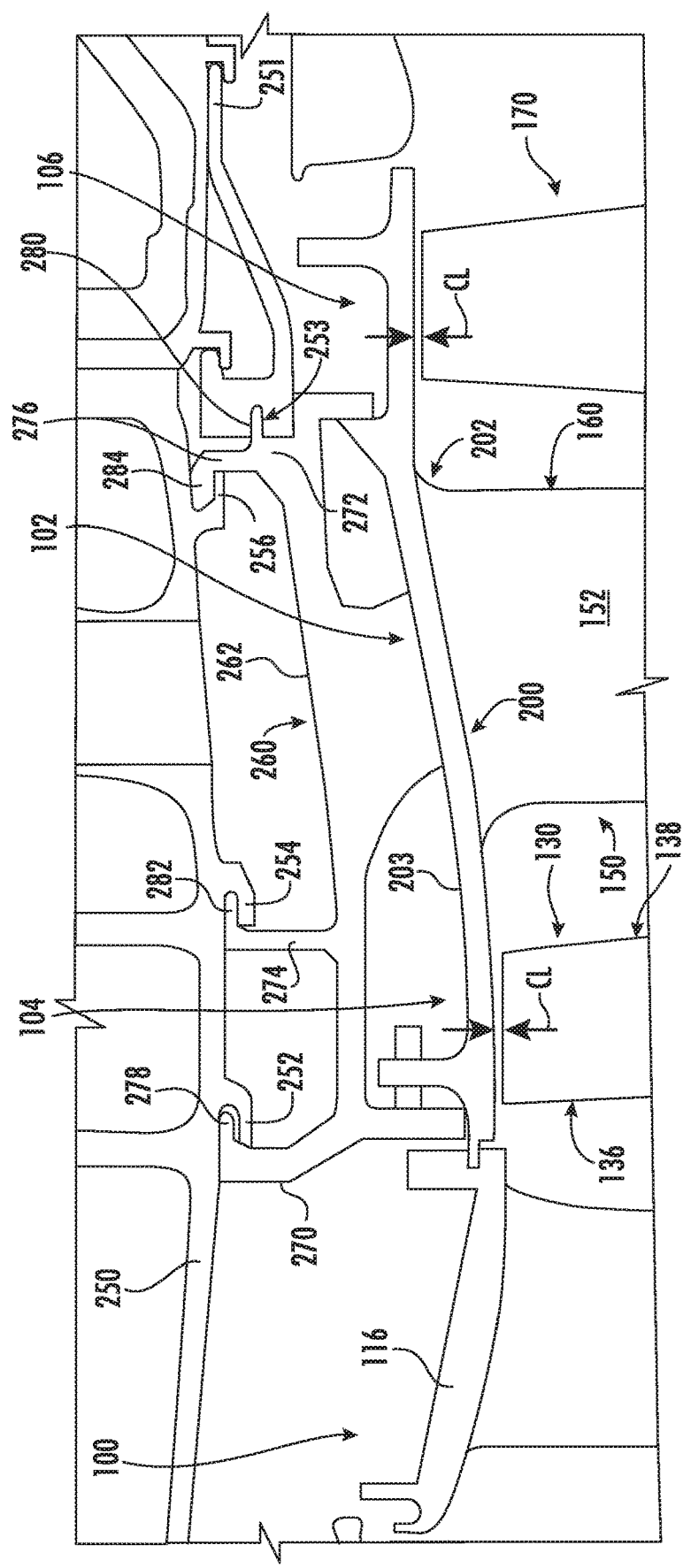
FIG. 9 provides a close up, side view of another embodiment of a portion of a turbine section of a gas turbine engine.

FIG. 9 provides a close up, side view of another embodiment of a portion of turbine section 28 of a gas turbine engine. For this embodiment, impingement baffle segment 262 includes first arm 270, second arm 272, a third arm 274, and a fourth arm 276. As shown, the first arm 270 couples the impingement baffle segment 262 with the casing 250 proximately radially outward of the leading edge 136 of the rotor blades 130 of the first rotor blade stage 104. More specifically, hook 278 of first arm 270 hooks into a groove defined by hook 252 of the casing 250. The second arm 272 couples the impingement baffle segment 262 with the casing 250 proximately radially outward of the rotor blades 170 of the second rotor blade stage 106. More particularly, hook 280 of the second arm 272 is hooked into groove 253 defined by ring 251.

As further shown in FIG. 9, the third arm 274 couples the impingement baffle segment 262 with the casing 250 proximately radially outward of the trailing edge 138 of the rotor blades 130 of the first rotor blade stage 104. In particular, a hook 282 of the third arm 274 hooks into a groove defined by a hook 254 of the casing 250. The fourth arm 276 couples the impingement baffle segment 262 with the casing 250 proximately radially outward of the trailing edge 160 of the vanes 152 of the second nozzle stage 102. More specifically, a hook 284 of the fourth arm 276 hooks into a groove defined by a hook 256 of the casing 250. By coupling the impingement baffle segments 262 with the casing 250 with the additional arms (e.g., the third and second arms 274, 276), the impingement baffle segments 262 are further secured to the casing 250 and provide additional support for holding the shroud 200 in place during operation of the turbofan engine 10 (FIG. 1). Moreover, as the impingement segments 262 are coupled with the casing 250 proximately radially outward of the first rotor blade stage 104 and the second rotor blade stage 106, the clearances CL between the shroud 200 and the rotor blades 130, 170 can be independently controlled.

In some embodiments, as noted previously, the shroud 200 or the shroud segments 202 of the shroud 200 can be formed of a CMC material, which is a non-metallic material having high temperature capability. Of course, other components of turbofan 10, including other components of HP turbine section 28, may be made from CMC materials (FIG. 1). Exemplary CMC materials utilized for such components may include silicon carbide, silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth.

In some embodiments, the shroud 200 or shroud segments can be formed of a metallic material, such as a nickel or cobalt alloy. Suitable nickel and cobalt alloys include RENE 41® Alloy produced by General Electric Co. of Schenectady, N.Y., USA; HAYNES® alloy 188 produced by Haynes International of Kokomo, Ind., USA; and UDIMET® alloy L-605 produced by Special Metal Corporation of New Hartford, N.Y., USA. However, any suitable metallic material may be used for shroud 200 and its one or more shroud segments 202. Additionally, the impingement baffle 260 and its segments X can be formed of a suitable metallic material, as previously noted.

Although shroud 200 is described herein with respect to HP turbine 28, it should be noted that shroud 200 may additionally be utilized in a similar manner in the low pressure compressor 22, high pressure compressor 24, and/or LP turbine 30. Accordingly, shrouds as disclosed herein are not limited to use in HP turbines but rather may be utilized in any suitable section of a turbofan 10, e.g., in any suitable section of core turbine engine 16 of turbofan 10 (FIG. 1).

Figure 10:
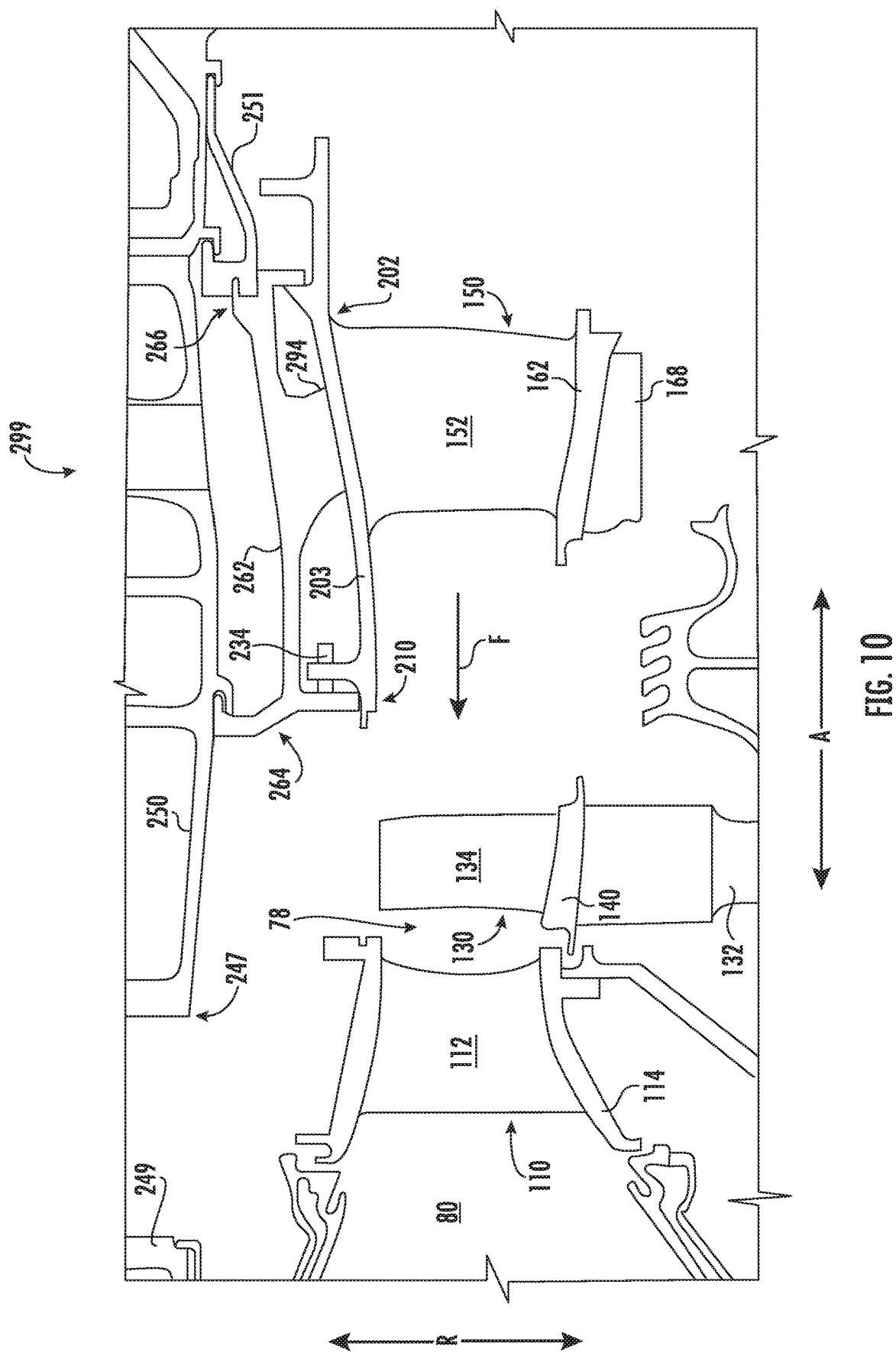
FIG. 10 provides a side view of a module being assembled into the gas turbine engine of FIG. 1.
Figure 11:
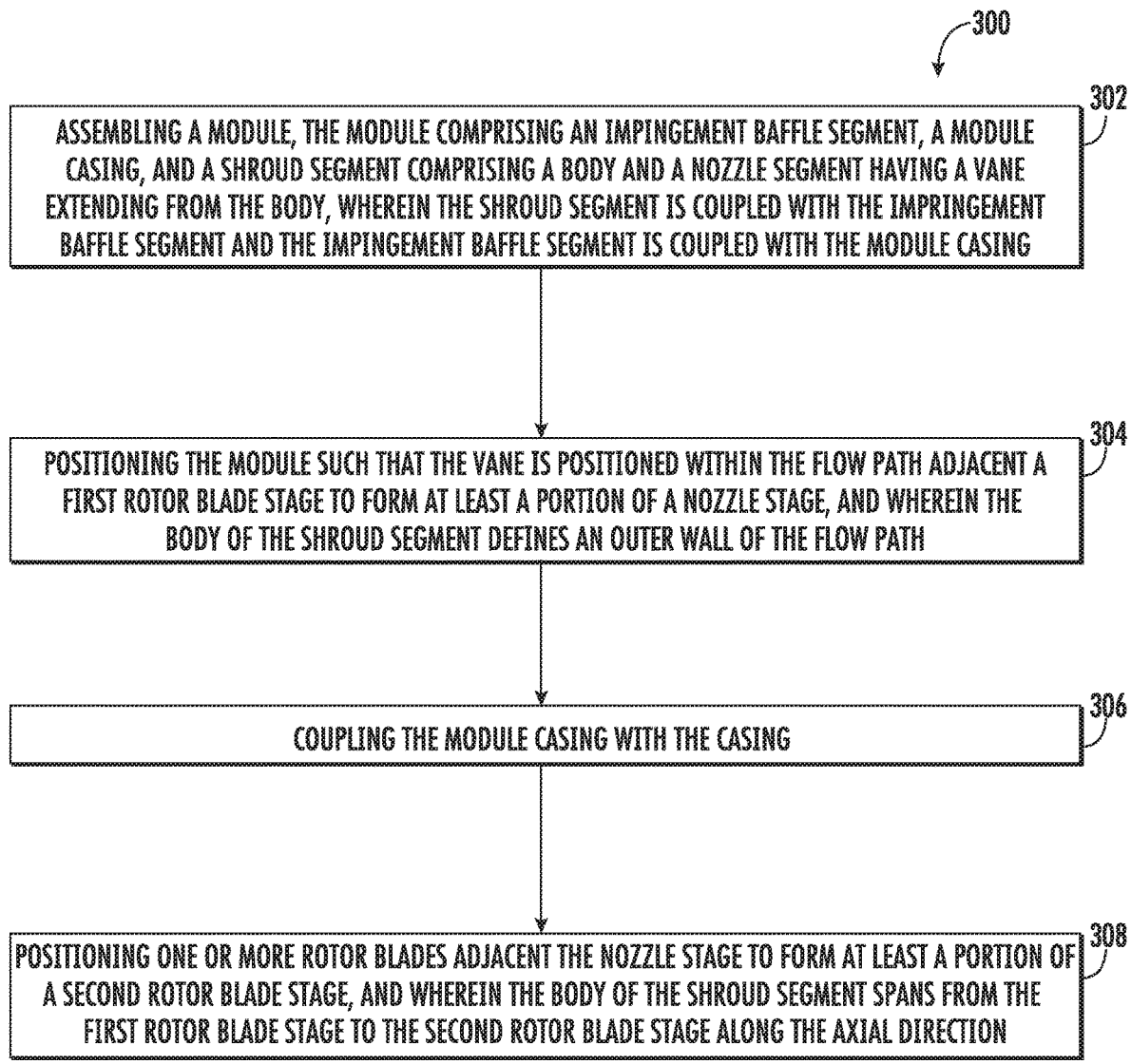
FIG. 11 provides a flow diagram of an exemplary method for assembling a gas turbine engine.

With reference now to FIGS. 10 and 11, an exemplary method (300) for assembling a gas turbine engine is provided. In particular, FIG. 10 provides a side view of a module 299 being assembled with an assembled portion of a gas turbine engine and FIG. 11 provides a flow diagram of exemplary method (300). The method (300) may be implemented to assemble various gas turbine engine configurations, such as e.g., the turbofan engine 10 of FIG. 1.

At (302), the method includes assembling a module. The module includes an impingement baffle segment, a module casing, and a shroud segment that includes a body and a nozzle segment having a vane extending from the body. To assemble the module, the shroud segment is coupled with the impingement baffle segment and the impingement baffle segment is coupled with the module casing.

For instance, the module can be module 299 of FIG. 10. As shown in FIG. 10, module 299 includes shroud segment 202, which includes body 203 and nozzle segment 150 having vane 152. Vane 152 is attached to or integral with the body 203 of shroud segment 202. Module 299 also includes impingement baffle segment 262 and module casing, which is the HP turbine casing 250 in this embodiment, and a ring 251. As shown, the body 203 of shroud segment 202 is coupled with the impingement baffle segment 262 at its forward end 210 by pin 234. Moreover, the shroud segment 202 is further coupled with the impingement baffle 260 by fastener or pin 298 (FIG. 8), which couples the honeycomb structure 168 of the nozzle segment 250 with strut member 294 of impingement baffle segment 262. Once the shroud segment 202 is coupled with the impingement baffle segment 262, the impingement baffle segment 262 is coupled at its first end 264 with casing 250, e.g., hook 278 of impingement baffle segment 262 is hooked with hook 252 of casing 250 (FIG. 3), and the impingement baffle segment 262 is coupled at its second end 266 with ring 251. In this way, impingement baffle segment 262 is coupled with casing 250.

Further, in some implementations, a plurality of impingement baffle segment 262 each coupled with a corresponding shroud segment 202 are coupled or seated on ring 251 along the circumferential direction C so that ring 251 is coupled with a ring of impingement baffle segments 262 and their corresponding shroud segments 202. In this way, the module 299 is configured as a ring structure and may be positioned at (304) as a ring structure. In some alternative implementations, impingement baffle segments 262 coupled with their respective shroud segments 202 are coupled directly with the casing 250 about the circumferential direction C so as to form a ring of impingement baffle segments 262 and corresponding shroud segments 202.

At (304), once the module 299 is assembled, the method (300) includes positioning the module such that the vane is positioned within the flow path adjacent a first rotor blade stage to form at least a portion of a nozzle stage. Further, the module is positioned such that the body of the shroud segment defines an outer wall of the flow path. For instance, as shown in FIG. 10, the module 299 is positioned by moving the module 299 in a forward direction along the axial direction A as shown by the arrow F. In FIG. 2, the module 299 is shown positioned in place, and as depicted, the vane 152 of the shroud segment 202 is positioned within the flow path, e.g., hot gas path 78. More particularly, vane 152 is positioned within flow path 78 downstream of the first rotor blade stage 104 and upstream of second rotor blade stage 106. When module 299 is positioned, the rotor blades 130 of the first rotor blade stage 104 may or may not be installed. Preferably, the rotor blades 130 of the first rotor blade stage 104 are installed or assembled prior to positioning module 299. Further, as depicted in FIG. 2, when the module 299 is positioned, the shroud segment 202 defines an outer wall of the flow path 78.

At (306), after the module 299 is positioned, the method (300) includes coupling the module casing with the casing. For instance, as shown in FIG. 2, the first end 247 of the module casing, denoted as HP turbine casing 250, is coupled with a casing, which in this embodiment is outer combustor casing 249. The casing 250 of module 299 can be coupled with outer combustor casing 249 in any suitable manner, such as e.g., a bolted joint-connection.

At (308), the method (300) includes positioning one or more rotor blades adjacent the nozzle stage to form at least a portion of a second rotor blade stage. When the rotor blades of the second rotor blade stage are positioned, the body of the shroud segment spans from the first rotor blade stage to the second rotor blade stage along the axial direction. In some implementations, the one or more rotor blades of the second rotor blade stage are positioned after the module is positioned. In alternative implementations of method (300), the one or more rotor blades of the second rotor blade stage are positioned prior to positioning the module.

For instance, as shown in FIG. 2, the body 203 of the shroud segment 202 spans from the first rotor blade stage 104 to the second rotor blade stage 106 along the axial direction A. More particularly, as depicted, the body 203 of shroud segment 202 spans at least from the leading edges 136 of the rotor blades 130 of the first rotor blade stage 104 to the trailing edges 178 of the rotor blades 170 of the second rotor blade stage 106. More preferably still, the body 203 spans at least from the leading edge 136 of the most forward rotor blade 130 of the first rotor blade stage 104 to the trailing edge 178 of the aft most rotor blade 170 of the second rotor blade stage 106. As further depicted in FIG. 2, for this embodiment, the body 203 of shroud segment 202 terminates at its first end 210 upstream of the leading edge 136 of the most forward rotor blade 130 of the first rotor blade stage 104 and downstream of the trailing edge 115 of the aft most vane 112 of the first nozzle stage 100 and the body 203 of shroud segment 202 terminates at its second end 212 downstream of the trailing edge 178 of the aft most rotor blade 170 of the second rotor blade stage 106.

In some implementations, the body of the shroud segment includes a tenon extending therefrom (e.g., as shown in FIG. 3). In such implementations, the gas turbine engine includes a first nozzle stage positioned upstream of the first rotor blade stage. The first nozzle stage includes a nozzle segment having an outer band defining a cutout. Moreover, in such implementations, during positioning the module, the tenon is inserted into the cutout of the outer band.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A turbine engine defining a flow path, the turbine engine comprising:
   a first rotor blade stage;
   a second rotor blade stage positioned downstream of the first rotor blade stage;
   a shroud comprising a shroud segment, the shroud segment comprising a body having a tenon extending therefrom, the body also comprising an inner surface and a vane, the vane extending from the body and disposed within the flow path between the first rotor blade stage and the second rotor blade stage to form at least a portion of a nozzle stage, wherein the entire inner surface of the body of the shroud segment defines an outer wall of the flow path and spans from a forward periphery of the first rotor blade stage to an aft periphery of the second rotor blade stage; and
   a first nozzle stage positioned upstream from the first rotor blade stage, the first nozzle stage comprising a nozzle segment having an outer band defining a cutout, wherein the tenon is positioned within the cutout of the outer band.

2. The turbine engine of claim 1, wherein the first rotor blade stage comprises a plurality of rotor blades and the second rotor blade stage comprises a plurality of rotor blades, the plurality of rotor blades of the of the first rotor blade stage each having a leading edge and the plurality of rotor blades of the of the second rotor blade stage each having a trailing edge, and wherein the body of the shroud segment spans at least from the leading edges of the plurality of rotor blades of the first rotor blade stage to the trailing edges of the plurality of rotor blades of the second rotor blade stage.

3. The turbine engine of claim 1, wherein the body of the shroud segment spans from the forward periphery of the first rotor blade stage to the aft periphery of the second rotor blade stage as a single, continuous piece.

4. The turbine engine of claim 1, wherein the vane is unitarily formed with the body.

5. The turbine engine of claim 1, wherein the first rotor blade stage comprises a plurality of rotor blades each having a leading edge, and wherein the turbine engine further comprises:
   a first nozzle stage positioned upstream of the first rotor blade stage, the first nozzle stage comprising a nozzle segment, the nozzle segment comprising a vane having a trailing edge, wherein the body of the shroud segment terminates downstream of the trailing edge of the vane of the nozzle segment of the first nozzle stage and upstream of the leading edges of the plurality of blades of the first rotor blade stage.

6. The turbine engine of claim 1, wherein the turbine engine defines a circumferential direction, and wherein the shroud segment is one of a plurality of shroud segments of the shroud spaced along the circumferential direction, wherein the vane of each of the plurality of shroud segments is disposed within the flow path between the first rotor blade stage and the second rotor blade stage to form the nozzle stage.

7. The turbine engine of claim 1, wherein the turbine engine defines an axial direction and a radial direction, and wherein the body of the shroud comprises a first portion, a second portion, and a middle portion disposed between and connecting the first portion with the second portion, the first portion defining the outer wall of the first rotor blade stage, the middle portion defining the outer wall of the nozzle stage, and the second portion defining the outer wall of the second rotor blade stage, and wherein the middle portion is angled with respect to the axial direction.

8. The turbine engine of claim 7, further comprising:
   a casing positioned outward of the shroud along the radial direction; and
   an impingement baffle comprised of an impingement baffle segment, the impingement baffle segment coupling the shroud segment with the casing, wherein the impingement baffle segment extends between a first end and a second end along the axial direction, and wherein the impingement baffle segment is angled with respect to axial direction as the impingement baffle segment extends between the first end and the second end.

9. The turbine engine of claim 1, wherein the turbine engine defines an axial direction and a radial direction, the turbine engine further comprising:
   a casing positioned outward of the shroud along the radial direction; and
   an impingement baffle segment coupled with the shroud segment and extending between a first end and a second end along the axial direction, wherein the impingement baffle segment is coupled with the casing along the axial direction radially outward of the first rotor blade stage and the impingement baffle segment is coupled with the casing along the axial direction radially outward of the second rotor blade stage.

10. The turbine engine of claim 1, wherein the turbine engine defines an axial direction, a radial direction, and a circumferential direction, and wherein the vane defines an internal cavity and the body of the shroud segment defines an opening, the turbine engine further comprising:
  a casing positioned outward of the shroud along the radial direction; and
  an impingement baffle segment coupling the shroud segment with the casing, the impingement baffle segment comprising:
    an axial member extending between a first end and a second end, wherein the axial member defines a plurality of cooling openings;
    a strut member extending inward from the axial member along the radial direction through the opening defined by the body of the shroud segment and into the internal cavity defined by the vane such that a cooling airflow can flow into the internal cavity.

11. The turbine engine of claim 1, wherein an inner band is attached to or integral with the vane of the shroud segment, the inner band defining a cold side and an opposing hot side, the turbine engine further comprising:
  a honeycomb structure attached to the cold side of the inner band;
  a casing positioned outward of the shroud along the radial direction; and
  an impingement baffle segment coupling the shroud with the casing, the impingement baffle segment comprising:
    an axial member;
    a strut member extending inward from the axial member along the radial direction and into an internal cavity defined by the vane of the shroud segment, wherein the strut member of the impingement baffle segment is coupled with the honeycomb structure.

12. A method for assembling a turbine engine, the turbine engine defining a flow path, an axial direction, a radial direction, and a circumferential direction and comprising a casing, the method comprising:
  assembling a module, the module comprising an impingement baffle segment, a module casing, and a shroud segment comprising a body having a tenon extending therefrom and a nozzle segment having a vane extending from the body, wherein the shroud segment is coupled with the impingement baffle segment and the impingement baffle segment is coupled with the module casing;
  positioning the module such that the vane is positioned within the flow path adjacent a first rotor blade stage to form at least a portion of a nozzle stage, and wherein the body of the shroud segment has an inner surface that defines an outer wall of the flow path;
  coupling the module casing with the casing;
  positioning a first nozzle stage upstream of the first rotor blade stage, the first nozzle stage comprising a nozzle segment having an outer band defining a cutout, and wherein during positioning the module, the tenon is inserted into the cutout of the outer band; and
  positioning one or more rotor blades adjacent the nozzle stage to form at least a portion of a second rotor blade stage, and wherein the entire inner surface of the body of the shroud segment spans from a forward periphery of the first rotor blade stage to an aft periphery of the second rotor blade stage along the axial direction.

13. The method of claim 12, wherein the shroud segment is one of a plurality of shroud segments of the module and the impingement baffle segment is one of a plurality of impingement baffle segments of the module, and wherein each of the plurality of shroud segments is coupled with a corresponding impingement baffle segment, and wherein each one of the plurality of impingement baffle segments is coupled to the ring along the circumferential direction.

14. The method of claim 12, wherein the one or more rotor blades of the second rotor blade stage are positioned after the module is positioned.

15. A gas turbine engine defining a flow path, an axial direction, a radial direction, and a circumferential direction, the gas turbine engine comprising:
  a first rotor blade stage comprised of a plurality of rotor blades;
  a second rotor blade stage spaced from the first rotor blade stage along the axial direction and comprised of a plurality of rotor blades;
  a shroud comprising a shroud segment, the shroud segment comprising a body extending along the axial direction having a tenon extending therefrom and a vane extending from the body along the radial direction and disposed within the flow path between the first rotor blade stage and the second rotor blade stage to form at least a portion of a nozzle stage therebetween, wherein the body of the shroud segment has an inner surface, the entire inner surface defines an outer wall of the flow path and spans from a forward periphery of the first rotor blade stage to an aft periphery of the second rotor blade stage;
  a first nozzle stage positioned upstream from the first rotor blade stage, the first nozzle stage comprising a nozzle segment having an outer band defining a cutout, wherein the tenon is positioned within the cutout of the outer band;
  a casing; and
  an impingement baffle comprising an impingement baffle segment, the impingement baffle segment coupling the shroud segment with the casing.

16. The gas turbine engine of claim 15, wherein the impingement baffle segment comprises a first arm and a second arm, wherein the first arm couples the impingement baffle segment with the casing radially outward of a leading edge of the rotor blades of the first rotor blade stage along the axial direction and the second arm couples the impingement baffle segment with the casing radially outward of the rotor blades of the second rotor blade stage along the axial direction.

17. The gas turbine engine of claim 15, wherein the body extends between a first end and a second end along the axial direction and has an inner surface and an opposing outer surface, and wherein the body further comprises:
  an anti-chording beam extending from the outer surface of the body proximate the second end, wherein the second end of the body is positioned radially outward of the rotor blades of the second rotor blade stage along the axial direction.

18. The gas turbine engine of claim 15, wherein the body extends between a first end and a second end along the axial direction and has an inner surface and an opposing outer surface, and wherein a first flange defining an opening extends from the outer surface of the first end of the body and the impingement baffle segment comprises a first flange defining an opening, wherein the impingement baffle segment is coupled with the shroud segment by a pin inserted into the opening defined by the first flange of the shroud segment and into the opening defined by the first flange of the impingement baffle segment.

19. The gas turbine engine of claim 15, wherein the shroud segment is formed of a ceramic matrix composite (CMC) material.

* * * * *